United States Patent [19]

Kramer

[11] 4,107,075
[45] Aug. 15, 1978

[54] APPARATUS FOR SPRAYING PLASTIC FOAM

[76] Inventor: Fritz Kramer, 911 Promontory Dr. West, Newport Beach, Calif. 92660

[21] Appl. No.: 530,982

[22] Filed: Dec. 9, 1974

[51] Int. Cl.² ............................................. B01J 13/00
[52] U.S. Cl. ........................ 252/359 E; 261/DIG. 26
[58] Field of Search ........... 252/359 E; 261/DIG. 26; 159/DIG. 4; 239/343; 222/190; 260/25 BC

[56] References Cited

U.S. PATENT DOCUMENTS

| | | | |
|---|---|---|---|
| 1,798,345 | 3/1931 | Wager | 252/359 E UX |
| 1,950,968 | 3/1934 | Burlingham | 252/359 E |
| 2,630,183 | 3/1953 | Foutz | 252/359 E UX |
| 2,860,856 | 11/1958 | Bauer | 252/359 E |
| 3,822,217 | 7/1974 | Rogers | 252/359 E |
| 3,841,844 | 10/1974 | Mitchell | 23/288 E |
| 3,853,784 | 12/1974 | Rogers | 252/359 E |
| 3,883,309 | 5/1975 | Ishizawa et al. | 23/285 |

OTHER PUBLICATIONS

Unit Operation of Chemical Engineering, McCabe & Smith, © 1956, pp. 353–354.

*Primary Examiner*—Morris O. Wolk
*Assistant Examiner*—Michael S. Marcus
*Attorney, Agent, or Firm*—Hans Berman

[57] ABSTRACT

An apparatus for spraying plastic foam includes two containers respectively adapted to hold a solution of a urea-formaldehyde precondensate in a first aqueous medium and a second aqueous medium including a catalyst which causes rapid hardening of the precondensate when the two aqueous media are mixed. A foaming chamber communicates with a source of compressed air and with one of the containers for dispersing the gas in the corresponding medium and for thereby forming a foam. A first conduit connects the foaming chamber to a mixing chamber, and a second conduit connects the other container to the mixing chamber. A third conduit leads outward of the mixing chamber and terminates in a nozzle orifice normally open to the atmosphere. The compressed air is used for conveying the foam and the medium in the other container to the mixing chamber for continuously mixing the contents of the mixing chamber and for conveying the resulting mixture outward through the nozzle orifice when the latter is open. When the orifice is blocked, a check valve in the first conduit prevents flow of the catalyzed mixture into the foaming chamber.

1 Claim, 1 Drawing Figure

U.S. Patent  Aug. 15, 1978  4,107,075
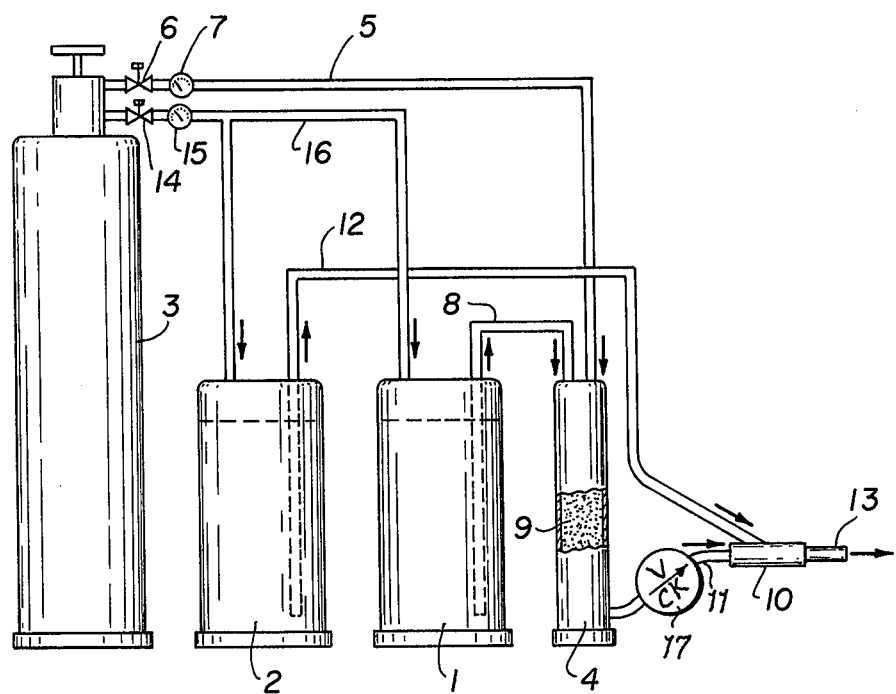

APPARATUS FOR SPRAYING PLASTIC FOAM

This invention relates to apparatus for spraying plastic foam, and particularly to an improvement in the apparatus disclosed and claimed in Bauer U.S. Pat. No. 2,860,856.

The least expensive cellular plastic available at this time for thermal and acoustical insulation of buildings is urea-formaldehyde foam, and the apparatus of the Bauer patent has been used commercially in this country with great success during at least a decade for preparing blankets of urea-formaldehyde foam, for injecting plastic foam into hollow walls and ceilings, and for similar applications. Compressed air is used for converting a first aqueous medium to foam, and the foam so formed is mixed with a second aqueous medium in a mixing gun. One of the two aqueous liquids contains water-soluble urea-formaldehyde precondensate (methylol-urea), and the other liquid contains the hardening agent for the precondensate, typically phosphoric acid. The mixture is discharged from the mixing gun at a high rate so that the mixture hardens only after leaving the gun and reaching its intended ultimate location.

Although an aqueous solution of methylolurea free from catalyst is supposed to be stable and not to harden for an extended period of time, it has been necessary to disassemble the conduits or containers holding the precondensate solution in the known apparatus every few hours to remove hardened resin particles. It was thought that the hardening of the precondensate is caused by a trace contaminant in the compressed air employed for making the foam and for conveying the several foam ingredients to the mixing gun, and that it would not be practical adequately to purify the large amounts of air employed in operating the apparatus, conventional filters and traps in the air lines having been found without beneficial effect.

It has now been discovered that a very small amount of freshly prepared, catalyzed foam, while still soft, is capable of initiating hardening of a surprisingly large amount of precondensate dissolved in a medium otherwise free of catalyst, and that the need for disassembling the spraying apparatus and cleaning it of resin hardened where there should not be any catalyst can be obviated in a very simple manner.

It had been observed frequently that the foam spraying apparatus needs to be cleaned of hardened resin at particularly short intervals when the foam mixture is injected into a hollow wall or other cavity, and it had been thought that the higher air pressure normally employed in such applications as compared to the discharge of the catalyzed foam into the open atmosphere accounted for the phenomenon.

I have found that the air pressure per se has little, if anything, to do with contamination of the spraying apparatus, but that the injection of plastic foam into an otherwise sealed cavity comes to an abrupt halt when the cavity is filled. The effect on the spraying apparatus is equivalent to a sudden closing of the spraying nozzle, and the kinetic energy of the flowing, catalyzed material causes some of it to be driven into the passageways carrying uncatalyzed precondensate, and results in the unexpected solidification of resin which requires disassembly and cleaning of the spraying apparatus.

Backward flow of catalyzed precondensate into passages containing precondensate without catalyst is prevented in a very simple manner by installing a check valve in a suitable location, and a modified Bauer apparatus equipped with such a check valve has been found to require very infrequent cleaning from solidified precondensate.

The sole FIGURE of the attached drawing shows the apparatus of the earlier patent modified according to this invention, in elevation.

The illustrated foam spraying apparatus includes a first container 1 which is a tank sealed from the atmosphere and containing an aqueous solution of urea-formaldehyde condensate and of a surfactant the purpose of which will presently become apparent. A second container 2, not significantly different from the tank 1, holds dilute, aqueous phosphoric acid solution, phosphoric acid being a known catalyst for the urea-formaldehyde precondensate, and causing rapid hardening of the same.

A steel bottle 3 holds compressed air. Another tank 4 provides a foaming chamber which communicates with the air bottle 3 through a pressure line 5 and reducing valve 6 equipped with a pressure gage 7. The tank 4 further communicates with the tank 1 through a pipe 8 whose intake orifice is below the liquid level in the tank 1. Glass beads 9 in the foaming chamber 4 disperse the compressed air received from the bottle 3 in the liquid received from the tank 1 so as to form a foam whose formation and stability is greatly enhanced by the surfactant in the precondensate solution.

An internal chamber in a mixing gun 10 is connected to the foaming chamber 4 by a conduit 11, and with the tank 2 by a conduit 12. A third conduit 13 leads outward of the mixing gun and constitutes a discharge nozzle terminating in an orifice normally open to the atmosphere.

Another pressure reducing valve 14 equipped with a gage 15 is connected with the portions of the tanks 1, 2 above the respective liquid levels by a manifold 16 so that the compressed air, directly or indirectly, causes foam to be conveyed from the foaming chamber 4 to the mixing gun 10 through the conduit 11, the catalyst bearing, aqueous medium to be conveyed to the mixing gun 10 through the conduit 12, and the mixture produced in the gun 10 to be conveyed outward of the gun through the conduit 13 when the nozzle orifice of the conduit 13 is open to the atmosphere.

The structure described so far is not significantly different from the disclosed by Bauer, and his patent provides a more detailed description of individual features.

According to this invention, a check valve 17 in the conduit 11 previous flow of catalyzed precondensate mixture toward the foaming chamber 4 when the orifice of the third conduit 13 is blocked.

The illustrated apparatus may be operated in a different manner without significant change in the results, and particularly without loss of the beneficial effects of the check valve 17. Thus, the urea-formaldehyde precondensate may be dissolved in an aqueous medium in the tank 2 and directly fed to the gun 10 through the conduit 12 while a suitable foam is prepared in the chamber 4 from air and an aqueous solution of phosphoric acid and a surfactant.

Precondensate flowing from the gun 10 into the foaming tank 4 would solidify there rapidly in the presence of a large excess of acid catalyst and clog the passages between the glass beads 9, and such clogging is safely avoided by the valve 17.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claim.

What is claimed is:

1. A plastic foam spraying apparatus comprising:
 (a) a first container adapted to hold a solution of a urea-formaldehyde precondensate in a first aqueous medium free from catalyst;
 (b) a second container adapted to hold a second aqueous medium including a catalyst capable of causing rapid hardening of said precondensate when said first medium is mixed with said second medium;
 (c) supply means for supplying a gas under a pressure higher than atmospheric pressure;
 (d) conduit means connecting said supply means to said first and second containers;
 (e) foaming means including a foaming chamber communicating with said supply means and with said first container for dispersing said gas in said first medium and for thereby forming a foam in said foaming chamber;
 (f) a mixing chamber;
 (g) a first conduit connecting said foaming chamber to said mixing chamber;
 (h) a second conduit connecting said second container to said mixing chamber;
 (i) a third conduit leading outward of said mixing chamber and terminating in an orifice normally open to the atmosphere, whereby said gas under pressure
  (1) conveys said foam from said foaming chamber to said mixing chamber through said first conduit,
  (2) conveys said second medium from said second container to said mixing chamber through said second conduit,
  (3) mixes the conveyed foam and the conveyed second medium in said mixing chamber, and
  (4) conveys the mixture so produced outward of said mixing chamber through said third conduit when said orifice is open to the atmosphere; and
 (j) check valve means in said first conduit for preventing flow of said mixture toward said foaming chamber when said orifice is blocked.

* * * * *